United States Patent
Cho et al.

(10) Patent No.: US 7,693,100 B2
(45) Date of Patent: Apr. 6, 2010

(54) ADAPTIVE FEEDBACK METHOD FOR CELLULAR COMMUNICATION

(75) Inventors: Sung-Hyun Cho, Suwon-si (KR); Sang-Boh Yun, Seongnam-si (KR); Taiwen Tang, Austin, TX (US); Robert W. Heath, Austin, TX (US)

(73) Assignees: Samsung Electronics Co., Ltd. (KR); Board of Regents, The University of Texas System, Austin, TX (US)

( * ) Notice: Subject to any disclaimer, the term of this patent is extended or adjusted under 35 U.S.C. 154(b) by 990 days.

(21) Appl. No.: 11/407,748

(22) Filed: Apr. 20, 2006

(65) Prior Publication Data

US 2006/0256805 A1      Nov. 16, 2006

Related U.S. Application Data

(60) Provisional application No. 60/673,130, filed on Apr. 20, 2005.

(30) Foreign Application Priority Data

Jun. 16, 2005    (KR)    ............ 10-2005-0051972

(51) Int. Cl.
   *H04W 4/00*     (2009.01)
   *H04J 3/00*     (2006.01)
   *H04J 3/16*     (2006.01)

(52) U.S. Cl. ............ 370/328; 370/329; 370/341; 370/345; 370/346

(58) Field of Classification Search ............ 370/328, 370/431, 445
See application file for complete search history.

(56) References Cited

U.S. PATENT DOCUMENTS

| 2004/0120411 | A1* | 6/2004 | Walton et al. | ............ 375/260 |
| 2005/0030897 | A1 | 2/2005 | Sandhu | |
| 2005/0181739 | A1* | 8/2005 | Krasny et al. | ............ 455/69 |

FOREIGN PATENT DOCUMENTS

CN      1479976      3/2004

OTHER PUBLICATIONS

Zhong-Hai Han et al., Opportunistic Scheduling with Partial Channel Information in OFDMA/FDD Systems, 2004.
Svedman et al., A QoS-aware Proportional Fair Scheduler for Opportunistic OFDM, 2004.

* cited by examiner

*Primary Examiner*—Ajit Patel
*Assistant Examiner*—Timothy Pham
(74) *Attorney, Agent, or Firm*—The Farrell Law Firm, LLP

(57) ABSTRACT

In an adaptive feedback method for a cellular communication system having plural terminals feeding back channel information to an access point, the system selects one of an opportunistic mode and a polling mode as a feedback mode between an access point and the terminals on the basis of system and traffic parameters, sets up the access point and the terminals for the selected feedback mode, and feeds back the channel information from the terminals to the access point in the selected feedback mode. The adaptive feedback method changes the feedback mechanism adaptively to the system and traffic environment, making it possible to increase the system throughput as well as to decrease the MAC overhead regardless of the variation of the number of MSs.

17 Claims, 10 Drawing Sheets

US 7,693,100 B2

ADAPTIVE FEEDBACK METHOD FOR CELLULAR COMMUNICATION

PRIORITY

This application claims priority under 35 U.S.C. § 119 to an provisional application entitled "Adaptive Feedback Method For Cellular Communication" filed in the U.S. Patent and Trademark Office on Apr. 20, 2005 and assigned Provisional Ser. No. 60/673,130, the contents of which are incorporated herein by reference.

BACKGROUND OF THE INVENTION

1. Field of the Invention

The present invention relates to a cellular communication and, in particular, to a feedback system and method which is capable of efficiently collecting channel information from mobile stations (MSs) for cellular communication.

2. Description of the Related Art

Cellular wireless communication networks support the transmission of data between a base station and multiple user terminals. In such systems that support high-speed data transmission, the link from the base station to the mobile system requires high capacity. One mechanism to improve throughput is to schedule transmissions to user terminals based in part on their channel state information. This method, known as multi-user diversity, sends data to user terminals when their channel conditions are good. Unfortunately, acquiring feedback from multiple user terminals takes system resources away from the uplink channel, from the user terminals to the base station. Thus acquiring channel state information for many user terminals is difficult to perform in practice.

Opportunistic beamforming has been proposed as such a multi-user diversity method implemented with scheduling in cellular systems based on channel station information. The opportunistic beamforming method assumes that the channel information is received perfectly from each user terminal. The performance gain of multi-user diversity grows as the number of active users in the system becomes large. In the opportunistic beamforming method, however, the amount of channel information that needs to be fed back to the base station also increases with the number of users.

A threshold-based feedback mechanism has been proposed to exploit the multi-user diversity. The amount of feedback, however, still increases in proportion to the total number of user terminals in the threshold-based feedback mechanism.

An opportunistic splitting algorithm proposed for the uplink multiple access channel is algorithmically attractive, however, it does not solve the system level design issues of multi-user feedback, and it is not directly applicable to downlink multi-user scheduling. Further, it is may be limited to the algorithmic assumptions in real systems.

SUMMARY OF THE INVENTION

The present invention has been made in an effort to solve the above problems and it is an object of the present invention to provide a feedback system and method capable of increasing network scalability by changing feedback mechanisms adaptive to the system environment.

It is another object of the present invention to provide an adaptive feedback system and method that is capable of improving the reliability of services scheduling by efficiently collecting the channel information.

It is still another object of the present invention to provide an adaptive feedback system and method that is capable of improving system performance with the reliable service scheduling based on the efficient collection of channel information.

In order to achieve the above objects, in one aspect of the present invention, the adaptive feedback method for a cellular communication system having plural terminals feeding back channel information to an access point, selects one of at least two feedback modes on the basis of system parameters, optimizes control parameters associated with the selected feedback mode, and feeds back the channel information from the terminals to the access point using the optimized control parameter in the selected feedback mode.

In another aspect of the present invention, the adaptive feedback method for a cellular communication system having plural terminals feeding back channel information to an access point selects one of an opportunistic mode and a polling mode as a feedback mode between the access point and the terminals on the basis of system parameters, sets up the access point and the terminals for the selected feedback mode, and feeds back the channel information from the terminals to the access point in the selected feedback mode.

In another aspect of the present invention, a cellular communication system includes an access point which selects one of at least two feedback modes on the basis of a mode selection parameter and a plurality of mobile stations, each feeding back channel information based on the selected feedback mode. Preferably, the access point includes a scheduler which schedules services to the mobile stations and determines service rate based on the channel information and traffic information associated with the services, and a central feedback controller which generates feedback control signal for controlling the selected feedback mode. The central feedback controller includes a mode selector which compares the mode selection parameter with a threshold value and selects the feedback mode based on a comparison result and an optimizer which dynamically optimizes control parameters associated with the feedback mode selected by the mode selector. Preferably, each mobile station includes a receiving processor that generates channel information and a local feedback controller that adjusts a feedback setting based on the feedback control signal received from the access point and feed backs the channel information with the feedback settings. The local feedback controller includes a local mode selector that selects the feedback mode based on the feedback control signal from the access point, and a parameter selector that selects parameters to be utilized for the selected feedback mode and feeds back the channel information with the selected parameter on the feedback settings.

BRIEF DESCRIPTION OF THE DRAWINGS

The above and other objects, aspects, and advantages of the present invention will be more clearly understood from the following detailed description taken in conjunction with the accompanying drawings, in which.

DETAILED DESCRIPTION OF THE PREFERRED EMBODIMENT

An adaptive feedback method and system according to the present invention will be described hereinafter with reference to the accompanying drawings.

The present invention introduces a central feedback controller, located at the base station (BS), and a local feedback controller, located at each mobile station (MS). The feedback controllers work together to limit the amount of feedback data required to each user (MS). There are many ways of coordinating how MSs send feedback information to the BS. In the present invention, one of several feedback modes is selected based on the feedback information as well as information about the current channel state. Additionally, a novel random access approach that uses random access control channels is employed in order to send feedback from the MSs to the BS.

Figure 1:
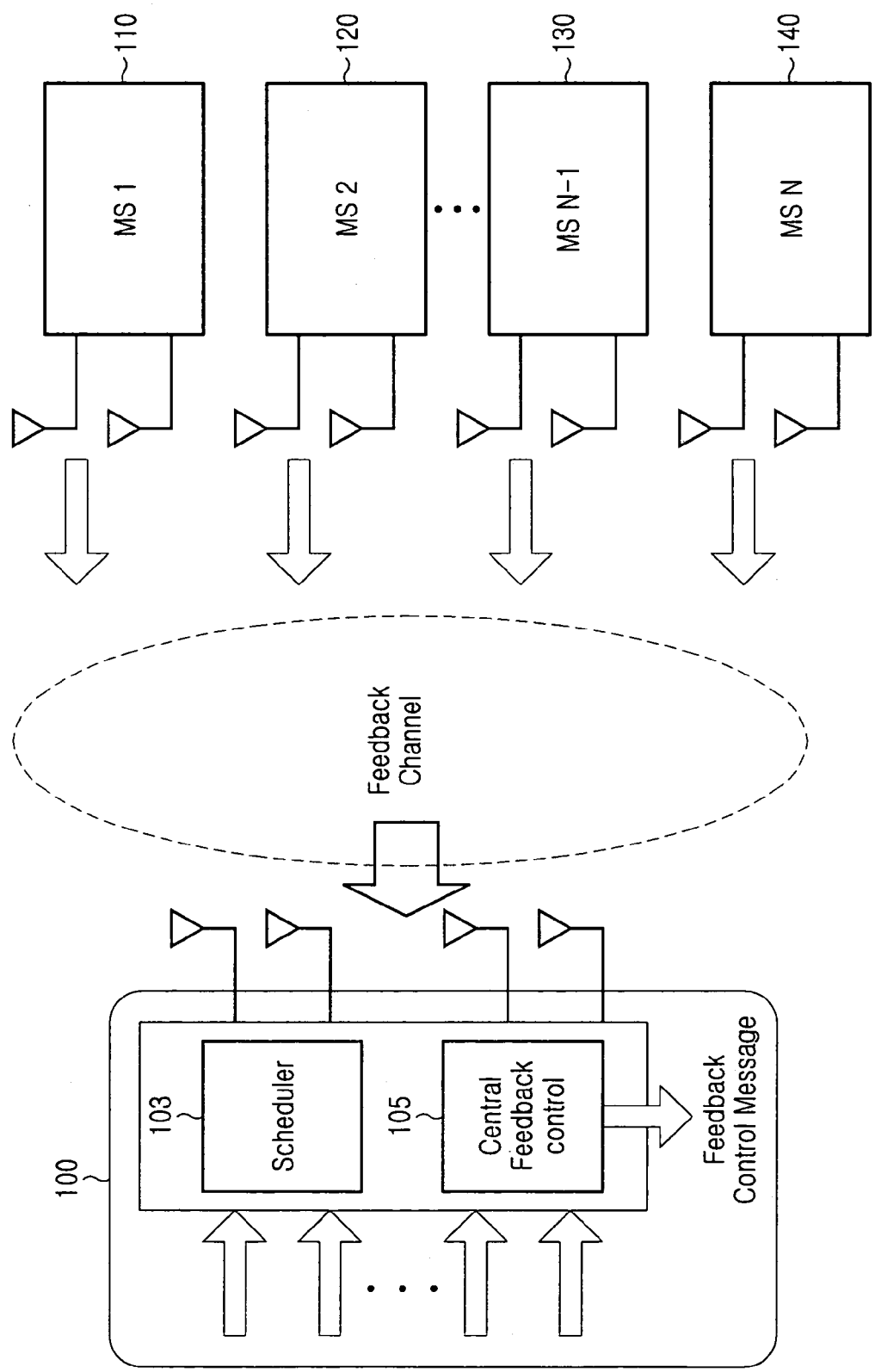
FIG. 1 is a schematic block diagram illustrating a multi-user multiple-input multiple-output (MIMO) cellular communication system according to the present invention.

FIG. 1 is a schematic block diagram illustrating a multi-user multiple-input multiple-output (MIMO) cellular communication system according to the present invention.

In FIG. 1, the exogenous traffic arrivals for different mobile stations (MSs) 110, 120, 130, and 140 are processed by a BS 100 and then are served via downlink transmission at a certain transmission rate in each scheduling frame.

The BS 100 schedules the services and determines the service rate based on the feedback and traffic information using a scheduling rule in each scheduling frame. The BS 100 requires the channel state information of the MSs 110, 120, 130, and 140 as inputs for the scheduling decision, such as scheduling policy and orders.

Figure 2:
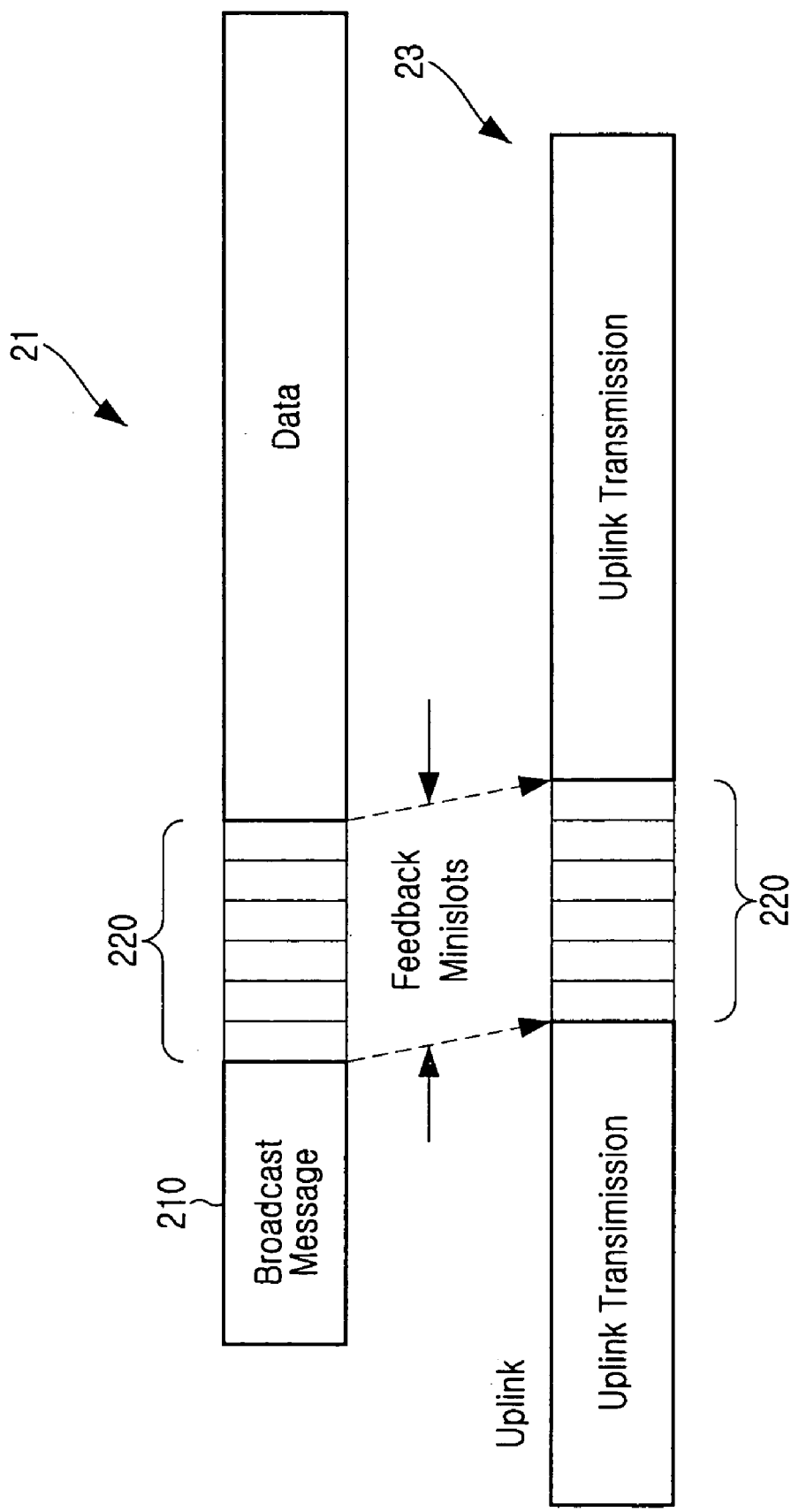
FIG. 2 illustrates uplink and downlink frames for a non-reciprocal system.

For feeding back the channel state information, a feedback channel is assigned to the MSs 110, 120, 130, and 140 at the beginning of each scheduling frame. Frequent feedback of such information is typically required in systems with non-reciprocal channel information, such as frequency division duplex (FDD) cellular systems. The feedback channel is a logical control channel that is used to carry the feedback information between the MSs 110, 120, 130, and 140 and the BS 100. Typically, the feedback channel has a duration that consists of mini-slots 220 within both downlink and uplink frames 21 and 23 as illustrated in FIG. 2. The feedback control message 210 is broadcasted in the downlink before the feedback mini-slots 220. Other implementations of the feedback channel may include dedicated frequency bands, coded channels in code division multiple access (CDMA) systems, and frequency tones in orthogonal frequency division multiplexing (OFDM) systems for example.

Figure 3:
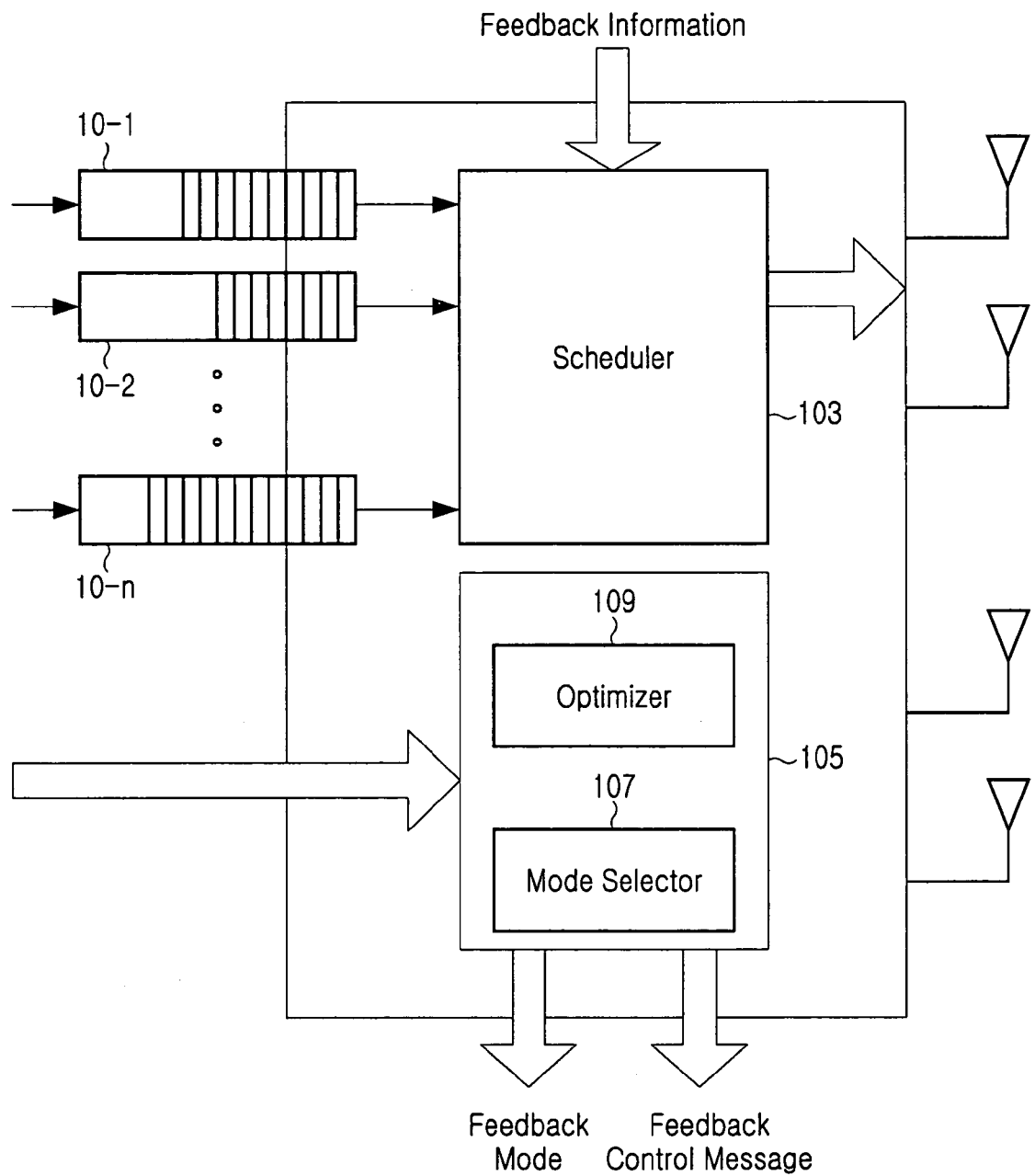
FIG. 3 is a block diagram illustrating the BS of FIG. 1 in more detail.

FIG. 3 is a block diagram illustrating the BS of FIG. 1 in more detail. In FIG. 3, the exogenous traffic arrivals for different MSs 110, 120, 130, and 140 are backlogged in the queues 10-1, 10-2, . . . , and 10-n of a base station (BS) 100. The BS 100 includes a scheduler 103, which schedules the service and determines the service rate, based on the feedback and traffic information using a scheduling rule in each scheduling frame; and a central feedback controller 105 to generate feedback control message for controlling the feedback operation of the system.

The scheduler 103 requires channel state information of the MSs 110, 120, 130, and 140 as input data for the scheduling decision. The scheduling decision, such as the scheduling policy and orders, is made with the queue state information and mobile users' channel information that is fed back through the feedback channel.

The central feedback controller 105 determines the feedback mode to be utilized and controls feedback operations under each feedback mode. The central feedback controller 105 interacts with the scheduler 103 to make control decisions for the feedback channel. The input data to the central feedback controller 105 includes system information, traffic information, and the knowledge of the scheduling principle. The system information describes the operation status of the system, and includes the number of active MSs, the transmit signal-to-noise ratio, and a priori knowledge on the possible channel state variation of the MSs (for example, distribution information), etc. The traffic information describes the queuing dynamics of various users.

The central feedback controller 105 includes a mode selector 107 to select the feedback mode and an optimizer 109 to dynamically optimize the feedback parameters for a selected feedback mode. The central feedback controller 105 makes the decision on the feedback mode and the feedback parameter based on the traffic and system information. Once the feedback mode is selected, the BS 100 broadcasts the feedback mode information to all the MSs 110, 120, 130, and 140. The feedback parameters are adjusted dynamically according to the traffic and system information, and they are packaged into feedback control messages and broadcasted to the MSs. The feedback mode information and the feedback parameters can be packaged into the same feedback control messages.

The mode selector 107 determines the feedback mode with reference to the traffic information and the system information. All input data to the central feedback controller 105 can be fed to the mode selector 107 to make the decision. The tradeoff is based on the system information and the traffic information. The system information and the traffic information are used for determining a tradeoff parameter, which is used for selecting the feedback mode.

A preferred mechanism of the mode selection is using lookup tables of feedback modes. In order to select the feedback mode, preferably, a lookup table is provided which maps values of a mode selection parameter obtained in consideration of the system parameter, the traffic parameter, and the tradeoff parameter to the corresponding feedback modes. By examining the mode selection parameter obtained from the input parameters to the lookup table, such as the number of active MSs and the number of feedback mini-slots, the corresponding entry in the lookup table can be located, which specifies the feedback mode. The lookup tables need to be designed before system deployment based on offline simulation or analysis. These relations can also be obtained from simulations or analysis. Also, the raw parameters can be utilized for selecting the feedback mode.

Once the mode selector 107 selects a feedback mode, the optimizer 109 optimizes the control parameters associated with the selected feedback mode under certain performance criteria.

Figure 4:
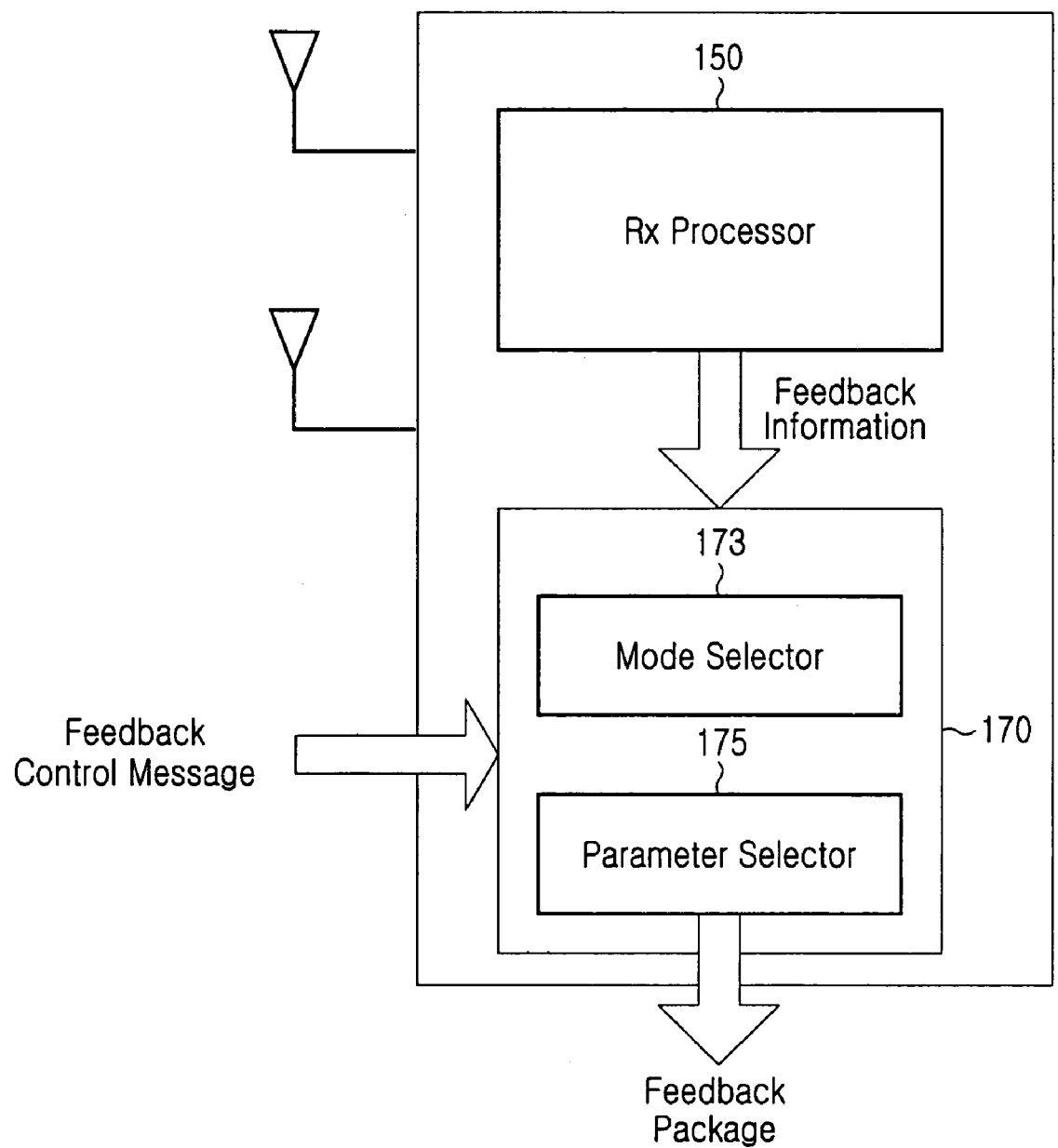
FIG. 4 is a block diagram illustrating an MS of FIG. 1 in more detail.

FIG. 4 is a block diagram illustrating an MS of FIG. 1 in more detail. In FIG. 4, each MS includes a receiving processor 150 and a local feedback controller 170 which dynamically adjusts the feedback settings according to the feedback control message that are broadcasted by the BS 100. The original feedback information (the channel state) is generated at the receiving processor 150 using channel estimation algorithms.

The local feedback controller 170 includes a local mode selector 173 and a parameter selector 175. The local mode selector 173 selects a feedback mode according to the feedback control message (or feedback mode information) from the BS 100 and the parameter selector 175 selects parameters to be utilized for the selected feedback mode according to the feedback control messages (or feedback parameters). The feedback information is packaged into a feedback data package with the selected mode and parameters and then is sent back to the BS 100 on the basis of the feedback setting. The packaging operation typically includes quantization to the channel state information, appending the package header, and performing error coding.

The feedback mode is defined as a mechanism of assigning and utilizing feedback channels. Specifically, it describes how feedback resources are allocated to different MSs and in turn implies how the MSs will feed back information using the allocated resources. Essentially, feedback modes are different implementations of feedback channels. More importantly, each mode defines the mechanism of accessing the feedback channel for each MS. In the present invention several feedback modes can be utilized. Under each feedback mode, variations on utilizing the feedback channel are parameterized by predefined control parameters. These control parameters can be adjusted to improve the feedback channel utilization under different system status.

An operation of the above structured adaptive feedback system will be described hereinafter. In an adaptive feedback method according to of the present invention, an opportunistic mode and a polling mode are exemplary employed for feeding back the channel information. One of the two modes is selected on the basis of the number of active MSs N and the number of mini-slots K.

When the number of active MSs is small, i.e., N<αK, the polling mode is more preferable than the opportunistic mode in terms of system throughput metric. The contention-based nature of the opportunistic feedback mode leads to performance loss when compared to the polling mode. The opportunistic mode, however, offers more performance advantages in average system throughput than the polling mode when the number of active MSs is large, i.e., N≧αK. This is attributed to the adaptive adjustment of the channel power threshold and the random access probability based on the number of active MSs in the opportunistic feedback mode. Here, α is the tradeoff parameter. Essentially, the tradeoff parameter determines the switching point as a function of the number of MSs and the number of mini-slots. The tradeoff parameter may be determined by simulations, analysis, or an ad hoc rule-of-thumb. In this embodiment this parameter is found through a simulation procedure. For example, if the throughput is the desired performance metric then the overall system throughput would be computed for each feedback mode as a function of the number of active MSs. The intersections of the simulation curves would determine the feedback mode switching point. In another embodiment α is found through a system implementation. The system starts with one feedback mode and periodically switches to other feedback modes. Overall throughput is monitored and optimal values of α are computed. For example, a preferred value of α is 2.2 for the case in which all users experience identical Rayleigh fading.

Once the opportunistic mode is selected as the feedback mechanism, it is required to optimize the parameters associated with the opportunistic mode for maximize the system throughput.

In the opportunistic mode, the channel power threshold η and the random feedback probability p are the corresponding optimization parameters. The mean sum rate over all active MSs may be used as an optimization criterion. The optimization problem can be stated as maximizing the long term mean sum rate parameterized by η and p under the constraint on the ranges of these parameters. The optimizer 109 uses iterative optimization algorithms to solve the optimization problems. Either offline or online computation of these parameters is preferable. The offline computation requires a priori information of the channel statistics, and targeting on maximizing the expected system throughput. The online computation, however, is implemented based on a closed-loop update of the parameters η and p based on the periodic system throughput measurement.

The offline implementation is done through an optimization procedure that aims to maximize the long-term average system throughput. The formulation of the average system throughput in the adaptive feedback method of the present invention requires the statistics of the channel variations, the scheduling rule, and the number of active MSs. An iterative algorithm such as the constrained gradient based search can be applied to find a good selection of the parameters.

In this embodiment, N denotes the number of active MSs and K denotes the number of mini-slots. It is assumed that the channel process for all MSs is stationary. To simplify the notation, the time index is dropped from all the parameters for the analysis. The number of MSs whose channel powers are above the threshold η is denoted by T. The channel power of the $j^{th}$ MS is denoted by $\chi_j=|h_j|^2$. Where $h_j$ is the channel state of $j^{th}$ MS. All MS channels are assumed to be independently and identically distributed, thus the index j can be dropped and the channel power distribution for all users can be denoted as $f_\chi(x)$.

Define $\alpha(\eta)=P\{\chi\geq\eta\}$ to be the probability that the channel power is above the threshold for one MS $$\alpha(\eta) = \int_\eta^\infty f_x(x)dx.$$

Binary random variable $S_j$ is used to denote the event that the $j^{th}$ MS is selected at the BS 100. When $S_j$ takes 1, the $j^{th}$ user is selected. The joint probability density function of T, $S_j$ and $\chi_j$ can be derived as the following Equation 1.

$$P_d\{\chi_j = x, S_j = 1, T = m\} = \\ f_{\chi_j}(x)\binom{N-1}{m-1}\alpha(\eta)^{m-1}[1-\alpha(\eta)]^{N-m} \\ \left\{\frac{1}{m}(1-[1-m(1-p)^{m-1}p]^K) + \frac{1}{N}[1-m(1-p)^{m-1}p]^K\right\} \\ I\{m > 0, x > \eta\} +$$

Equation 1

-continued $$f_{\chi_j}(x)\binom{N-1}{m}\alpha(\eta)^m[1-\alpha(\eta)]^{N-m}[1-m(1-p)^{m-1}p]^K \times$$

$$\frac{1}{N}I\{0 \leq m \leq N-1, x \leq \eta\}$$

where I{•} denotes the indicator function. The first term in the summation characterizes the probability density that the $j^{th}$ MS's channel power is above the threshold $\eta$, and it is selected either due to the successful feedback or because of the random selection when all users whose channel powers are above the threshold fail to feed back.

The second term expresses the probability density that the $j^{th}$ MS's channel power is below the threshold $\eta$, and it is selected due to the random selection at the BS. The mean sum rate of all the MSs can be written as Equation 2.

$$C(p,\eta) = \sum_{j=1}^{N} E_{(\chi_j, S_j, T)}[\log_2(1+\rho\chi_j)I\{S_j=1\}] \quad \text{Equation 2}$$

where $\rho$ is the average signal to noise ratio at the MS.

The optimization of parameters p and $\eta$ is important for maximizing sum rate. With a pre-selected K and a given number of active MSs N, the optimization problem is formulated as follows:

$$\max_{p,\eta} C(p,\eta)$$

$$0 \leq p \leq 1, \eta \geq 0$$

The optimization may not be convex. In this embodiment, a simple constrained gradient search method is applied to find a local maximizer under an assumed channel power distribution.

The scheduler at the BS controls the fair scheduling to the MSs under the Opportunistic Mode. To further improve the performance, a fairness constraint can be applied to the original optimization problem. The purpose of the optimization is to find suitable choices of the feedback threshold and the feedback probability to achieve the best overall system throughput as well as meet the fairness requirement.

Another useful enhancement to the scheme is to use multiple scheduling classes with different channel power thresholds and feedback probabilities, and perform an optimization of these parameters to maximize the overall system throughput under the imposed fairness constraints to each class of MSs.

It is assumed that all MSs' channels follow i.i.d. Rayleigh fading with zero mean and unit variance. (i.i.d. is the abbreviated form of "independently and identically distributed." The channel power $\chi$ follows exponential distribution, and the probability density function for $\chi$ can be written as $f_\chi(x) = e^{-x}$. Thus the probability that the channel power is above the threshold $\eta$ is $\alpha(\eta) = e^{-\eta}\chi$.

The mean sum rate can then be simplified as Equation 3.

$$C(p,\eta) = \quad \text{Equation 3}$$

$$\sum_{m=1}^{N} \int_{\eta}^{\infty} \log_2(1+\rho x)e^{-x}dx \cdot \binom{N-1}{m-1}\alpha(\eta)^{m-1}[1-\alpha(\eta)]^{N-m}$$

-continued $$\left\{\frac{1}{m}+\left(\frac{1}{N}-\frac{1}{m}\right)[1-m(1-p)^{m-1}p]^K\right\}+$$

$$\sum_{m=0}^{N-1}\int_0^\eta \log_2(1-\rho x)e^{-x}dx \cdot \binom{N-1}{m}$$

$$\alpha(\eta)^m[1-\alpha(\eta)]^{N-m}[1-m(1-p)^{m-1}p]^K$$

It is possible to find the optimal solution to the parameters by an iterative constrained gradient search.

Figure 5:
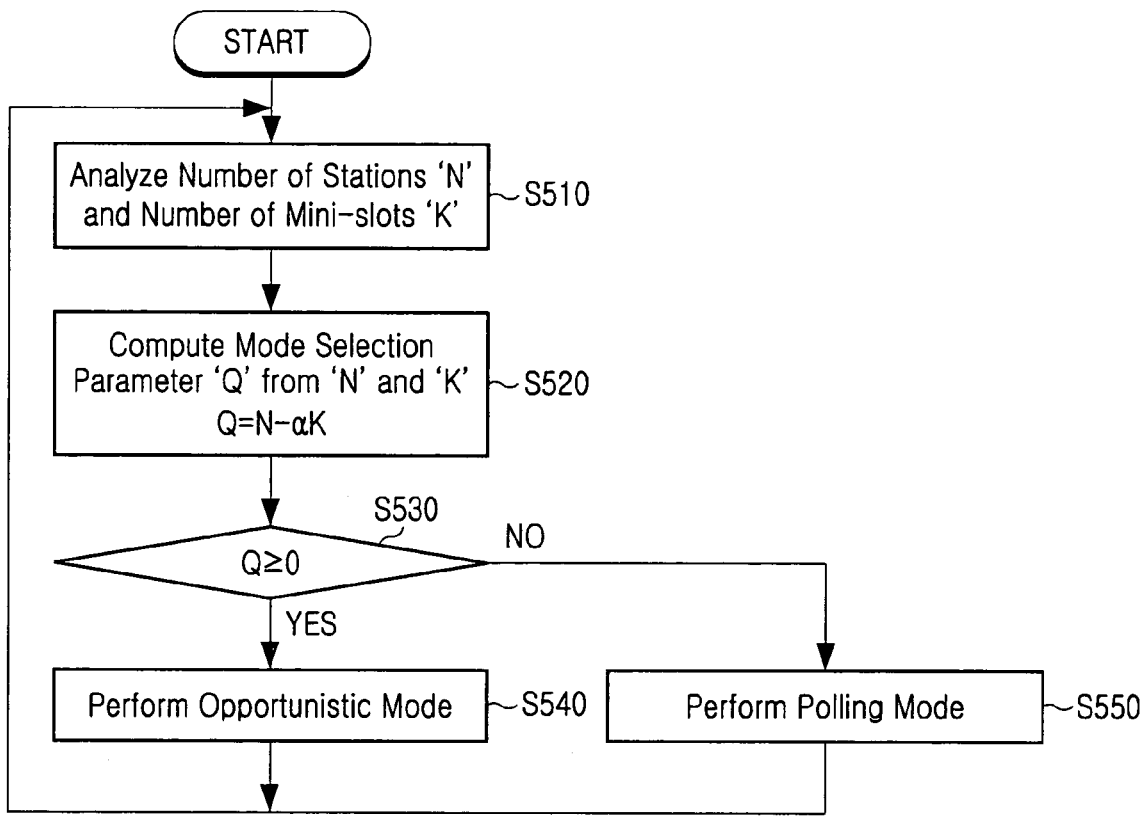
FIG. 5 is a flowchart illustrating the adaptive feedback method according to a preferred embodiment of the present invention.

For the online implementation, the BS monitors the average system throughput in a time window. The BS adjusts the parameters $\eta$ and p periodically, and collects the average throughput after each parameter update, denoted by $C(p,\mu)$. A preferred algorithm for parameter update is the Finite Difference Stochastic Approximation (FDSA) algorithm. For the parameter pair $(p_k, \eta_k)$ at the $k^{th}$ update, it is required to measure the perturbations near this parameter pair, and numerically to evaluate the gradient of the average throughput within a time window. The parameter update follows the recursive procedure in the FDSA algorithm. FIG. 5 is a flowchart illustrating the adaptive feedback method according to the present invention In FIG. 5, the BS analyzes the number of the MSs 'N' and the number of mini-slots 'K' on the basis of the system information and the traffic information at step S510 and then computes a mode selection parameter 'Q' from the N and K at step S520. Once the mode selection parameter Q is determined, the BS determines whether or not Q is greater than or equal to '0' at step S530. If Q is greater than or equal to 0, the BS selects the opportunistic mode, broadcasts a mode selection message indicating the opportunistic mode with $\eta$ and p, to the MSs, and then enters the opportunistic mode at step S540. Otherwise, the BS selects the polling mode, broadcasts a mode selection message indicating the polling mode to the MSs, and then enters the polling mode at step S550. The mode selection message includes a feedback mode indicator and may contain parameters required for selected feedback mode.

Figure 6:
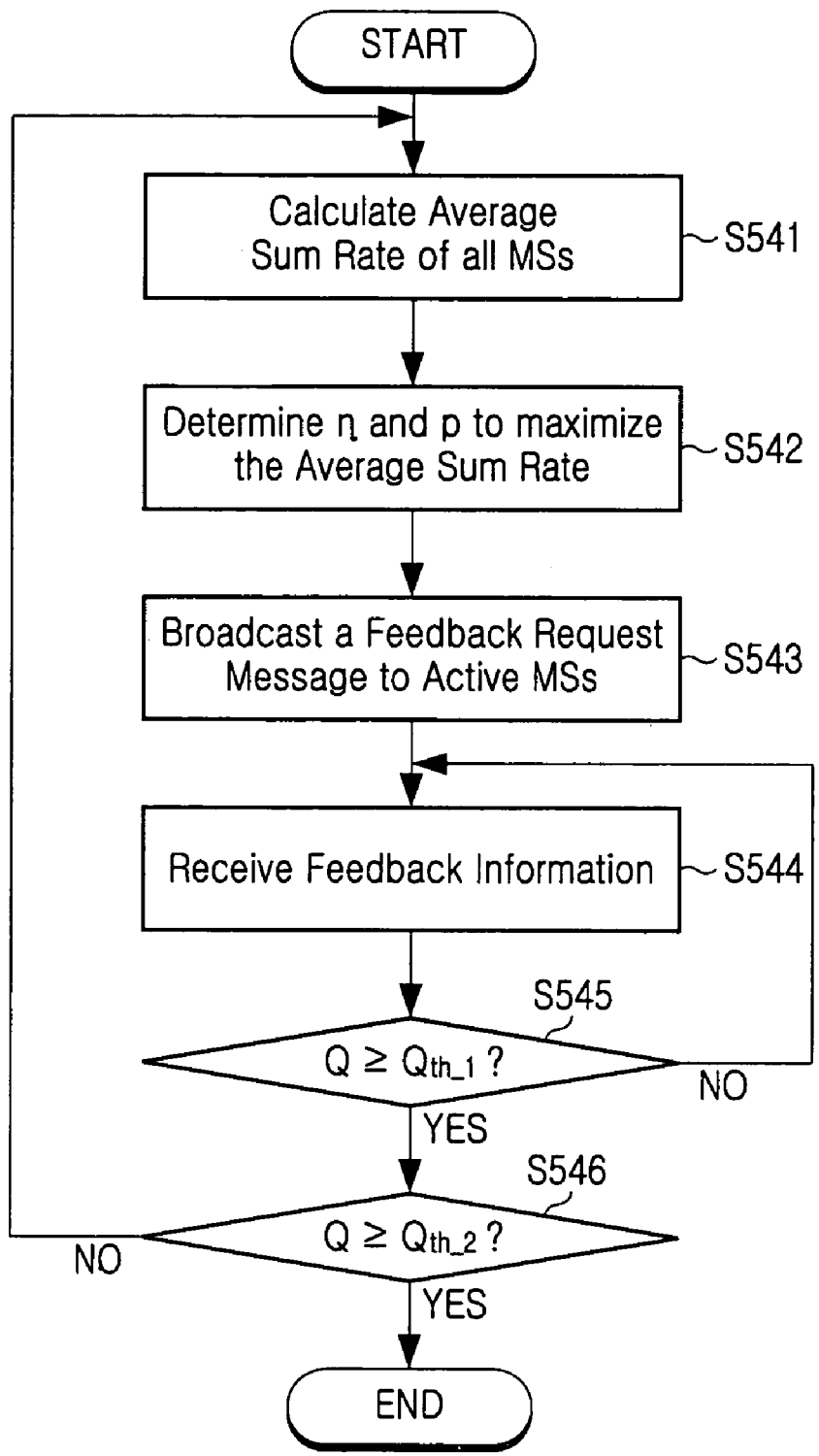
FIG. 6 is a flowchart illustrating a procedure of the opportunistic mode of FIG. 5 in view of the BS.

FIG. 6 is a flowchart illustrating a procedure of the opportunistic mode of FIG. 5 at a BS. As shown in FIG. 6, once the BS enters the opportunistic mode, the BS calculates the mean sum rate of all the MSs on the basis of the traffic information or channel information received from the MSs at step S541 and then determines a channel power threshold $\eta$ and a random feedback probability p to maximize the mean sum rate at step S542. Sequentially, the BS broadcasts the feedback request message including $\eta$ and p to the MSs at step S543 and receives, in response to the feedback request message, feedback information in a time window from the MSs at step S544. The BS counts the number of MSs on the basis of the feedback information from the MS, calculates the mode selection parameter Q using the current N and K to be used for feedback, and determines whether the current Q is greater than or equal to a first mode selection parameter threshold $Q_{threshold\_1}$ at step S545. If Q is greater than or equal to $Q_{threshold\_1}$, the BS determines whether Q is greater than or equal to a second mode selection parameter threshold $Q_{threshold\_2}$ at step S546. Otherwise, the algorithm goes to the step S544. If Q is greater than or equal to $Q_{threshold\_2}$, the BS terminates the opportunistic mode for reselecting the feedback mode. Otherwise, the algorithm goes back to the step S541.

Figure 7:
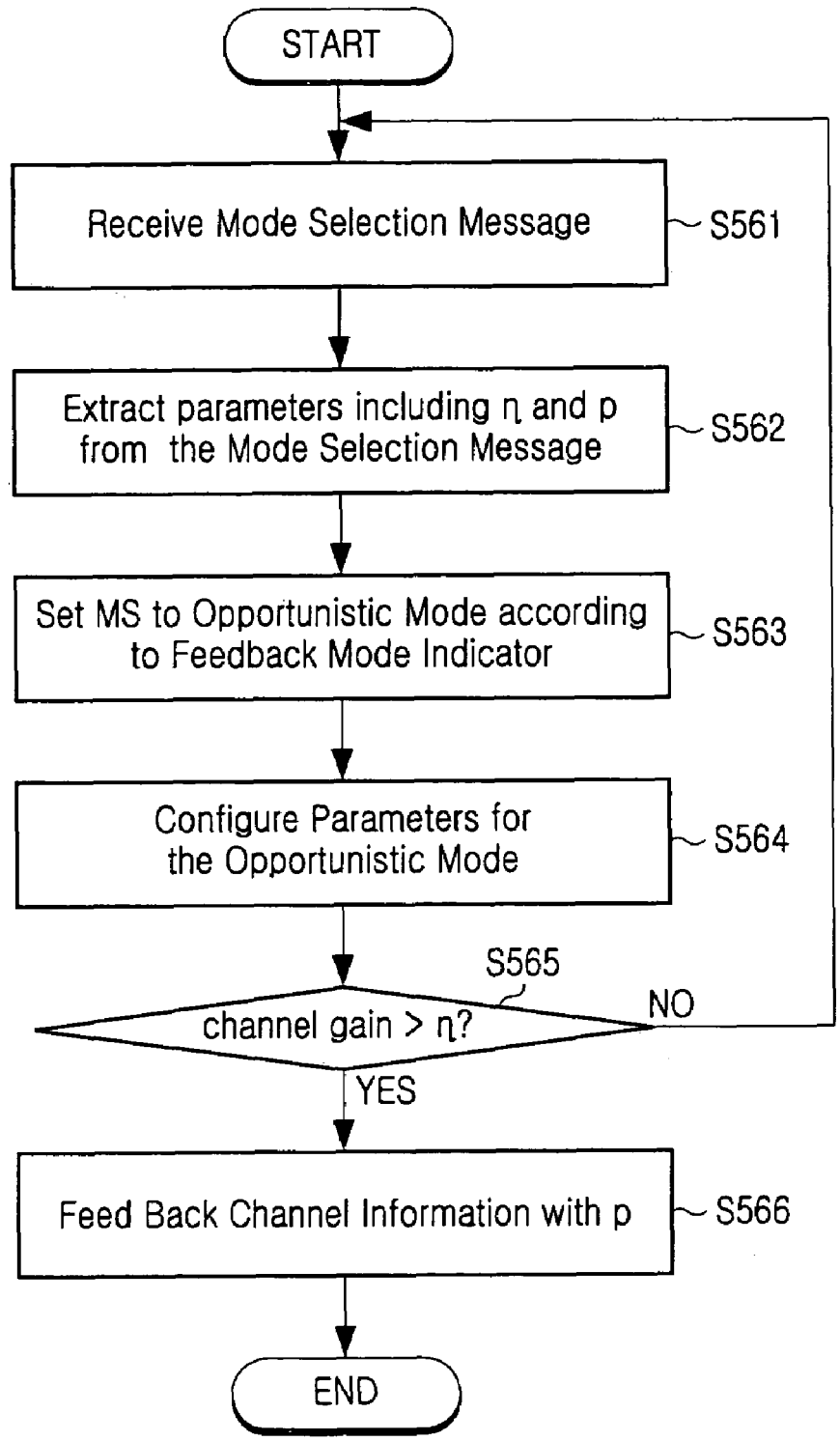
FIG. 7 is a flowchart illustrating a procedure of the opportunistic mode of FIG. 5 in view of each MS.

FIG. 7 is a flowchart illustrating a procedure of the opportunistic mode of FIG. 5 at each MS.

Referring to FIG. 7, once the MS receives the mode selection message from the BS at step S561, the MS extracts parameters such as a feedback mode indicator, η, and p from the mode selection message at step S562. Then the MS sets up itself for the opportunistic mode according to the feedback mode indicator at step S563 and configures parameters for the opportunistic mode at step S564. After completing the parameter configuration, the MS checks and compares its channel gain with the channel power threshold η and determines whether the channel gain is greater than η at step S565. If the channel gain is greater than η, the MS feeds back the channel information with the random feedback probability p at step S566. Otherwise, the algorithm goes back to the step S561. The parameters η and p may be received in other messages such as the feedback request messages, other than the mode selection message.

Even though the adaptive feedback method according to the above embodiment of the present invention has employed two feedback mechanisms, i.e., the opportunistic mode and the polling mode, the number and types of feedback mechanisms to be utilized are not limited.

Figure 8:
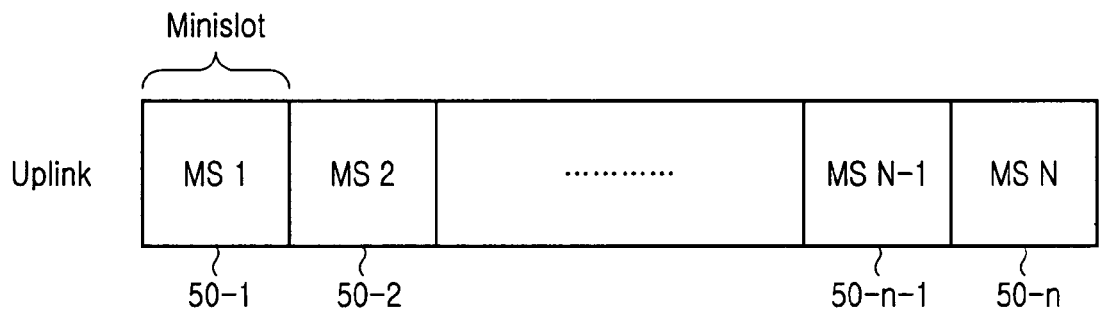
FIG. 8 is a block diagram illustrating a framing structure of a dedicated channel mode for the adaptive feedback method of the present invention.

FIG. 8 is a block diagram illustrating a framing structure of a dedicated channel mode for the adaptive feedback method of the present invention.

When the number of MSs is smaller than the number of feedback mini-slots, the dedicated channel mode can be used. Each MS is associated with a fixed minislot to carry the channel information. Referring to FIG. 1 and FIG. 5, the mini-slots 50-1, 50-2, 50-n−1, and 50-n are associated with MSs 110, 120, 130, . . . , 140, respectively.

Figure 9:
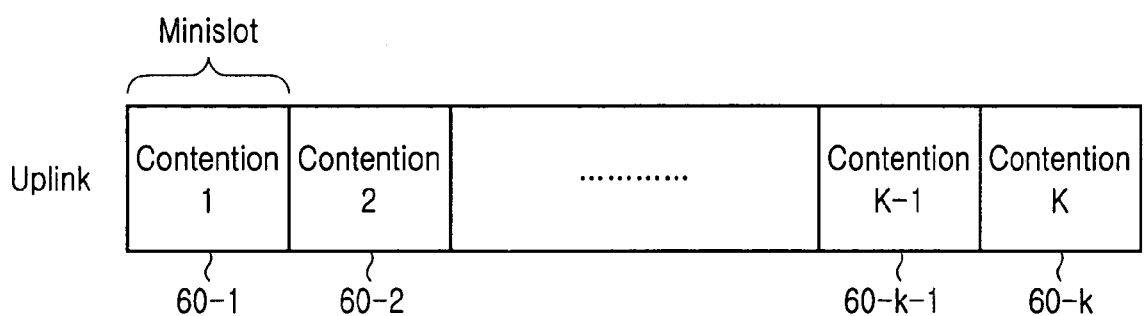
FIG. 9 is a block diagram illustrating a framing structure of an opportunistic mode for the adaptive feedback method of the present invention.

FIG. 9 is a block diagram illustrating a framing structure of an opportunistic mode for the adaptive feedback method of the present invention.

In the opportunistic mode, the MSs feed back their channel information in the feedback mini-slots in a slotted ALOHA fashion, such that the MSs content to each other in every mini-slots 60-1, 60-2, . . . , 60-k−1, and 60-k. ALOHA is a well-known media access protocol for communication systems.

If multiple MSs feed back in the same minislot, a collision happens, which results in failure of the feedback attempt. When only one MS feeds back its channel information in a minislot, the feedback package will be successfully delivered to the BS. This mode is applicable to the scenario where there are many active MSs in the system (the number of active MSs "N" is much larger than the number of mini-slots "K"). The feedback control parameters are the channel power threshold η and the random feedback probability p.

In the opportunistic mode, first the BS initializes the parameters η and p according to the system and traffic information. The initial values of the parameters are taken from predefined lookup tables. With online implementation, these parameters can be tracked according to the evolution of the time series of the average throughput described above. The parameters are broadcasted to all the MSs in the broadcast messaging period before feedback mini-slots.

Upon receiving the parameters, each MS updates the setting of its local feedback controller with the received control message and collects the channel state information (CSI) measured by the receiving processor. The CSI includes channel power. The MS compares the channel power with the channel power threshold η. If the channel power is above the channel power threshold η, the MS (local feedback controller) decides whether to feed back the information to the BS with probability p. Otherwise, the BS does not feed back the information. If it is decided to feed back the channel information, the local feedback controller packages the channel state information into a feedback package and then feeds back the package to the BS. The packaging process involves quantization to the channel state and low rate error coding to protect the message.

The BS collects the feedback packages in each mini-slot if there is no collision. If there are multiple feedback packages from different MSs at the BS after the contention mini-slots, the BS randomly picks one MS. In the case that collision happens through all mini-slots, the BS randomly selects an MS and requests the MS to feed back the channel state information after feedback contention mini-slots to schedule the transmission. The channel state information is extracted from the feedback packages, and fed to the scheduler. The scheduler makes the scheduling decision based on the channel and traffic information.

Figure 10:
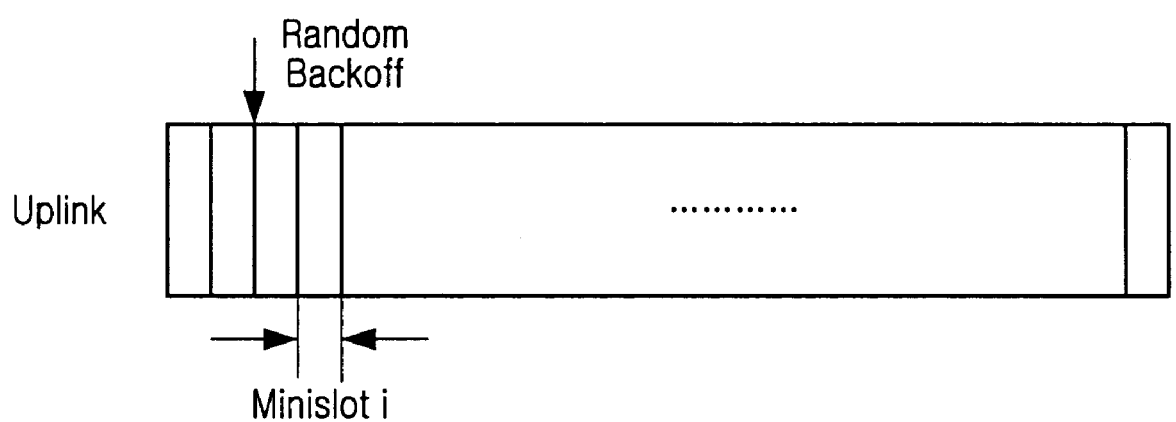
FIG. 10 is a block diagram illustrating a framing structure of a random backoff with carrier sensing mode for the adaptive feedback method of the present invention.

FIG. 10 is a block diagram illustrating a framing structure of a random backoff with carrier sensing mode for the adaptive feedback method of the present invention.

In the random backoff feedback mode, all the MSs are assumed to be able to sense the transmissions from any other MS. The random backoff feedback mode is applicable to a pico-cell scenario where the MSs are closely located to the BS and each other. Each MS randomly backoffs a number of mini-slots before attempting to access the feedback channel. While an MS backoffs, it also performs carrier sensing. If the MS senses that the medium is idle, i.e., no other MSs are using the feedback channel, its feedback package will be sent out. Otherwise, it continues the carrier sensing until the medium is idle. A collision may still happen due to the propagation delays of the packages. To lower the probability of collision, when an MS senses that the medium is idle, it attempts to access the medium with a probability p.

The number of backoff mini-slots is determined by the channel power. The relation between the backoff mini-slots and the channel power is determined offline, and it is stored in a backoff lookup table (BLT). The higher the channel power is, the smaller the backoff duration should be. The central feedback controller at the BS computes the relation between the channel power and the number of backoff mini-slots. Then the relation is broadcasted to the MSs in feedback control message. Each MS updates its local feedback controller with the received feedback control messages.

Figure 11:
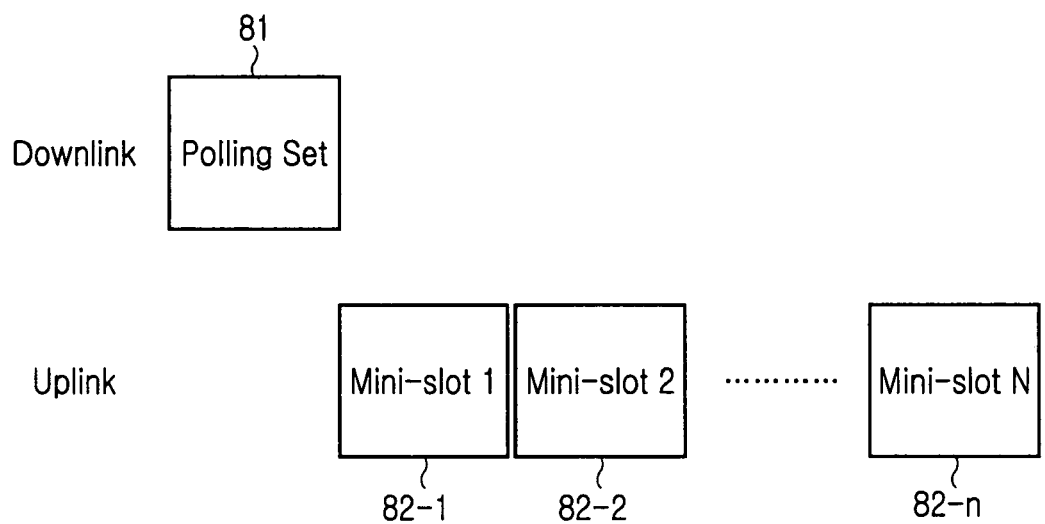
FIG. 11 is a block diagram illustrating a framing structure of a polling mode for the adaptive feedback method the present invention.

FIG. 11 is a block diagram illustrating a framing structure of a polling mode for the adaptive feedback method the present invention.

In the polling mode, the BS determines a set of MSs who should feed back their channel states based on the traffic and system information. The BS broadcasts the polling set message 81 to all the MSs. Upon receiving the polling set message 81, the MSs feed back their channel state information one by one in the mini-slots 82-1, 82-2, . . . , and 82-n according to the order specified in the polling set message 81.

Figure 12:
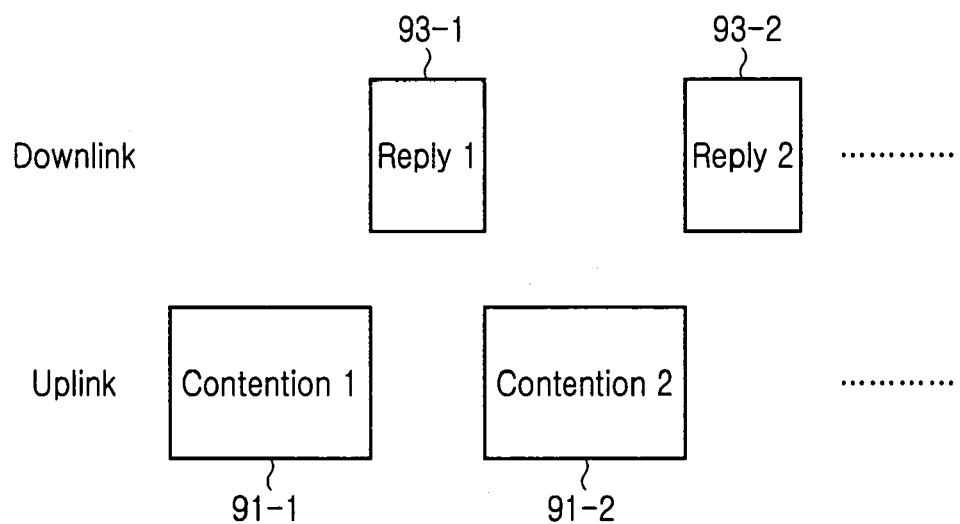
FIG. 12 is a block diagram illustrating a framing structure of a coordinated mode for the adaptive feedback method of the present invention.

FIG. 12 is a block diagram illustrating a framing structure of a coordinated mode for the adaptive feedback method of the present invention.

In the coordinated mode, each mini-slot is decomposed into an uplink contention mini-slot 91-1 and 91-2 and a downlink reply mini-slot 93-1 and 93-2. All MSs randomly attempt to feed back in each uplink contention mini-slot in a slotted ALOHA fashion. The downlink sends back a reply message to all MSs to indicate the status of collision in the reply mini-slot 93-1 and 93-2. An interval that specifies the range of the channel power is used to trigger the feedback. The position and the range of the interval are dynamically adjusted at the central feedback controller based on the collision status.

Such information is also broadcasted to all the MSs in the reply messages. If an MS finds that its channel power is inside the interval, it feeds back the channel station information to the BS. Otherwise, it does not perform feed back. By monitoring the collision status, the BS can dynamically adjust the interval until there is only one MS's channel power inside the interval, or declares a failure due to running out of the mini-slots. If no MS is found, the BS randomly polls an MS to request its feedback after the coordinated feedback mini-slots.

While this invention has been described in connection with what is presently considered to be the most practical and preferred embodiment, it is to be understood that the invention is not limited to the disclosed embodiments, but, on the contrary, is intended to cover various modifications and equivalent arrangements included within the spirit and scope of the appended claims.

As described above, since the adaptive feedback method of the present invention changes the feedback mechanism adaptively to the system environment, it is possible to increase the system throughput as well as decrease the MAC overhead regardless of the variation of the number of MSs.

Also, the adaptive feedback method of the present invention selects a feedback mode suited for the traffic and system environments so as to efficiently collect the channel information, resulting in improvement of the scheduling reliability.

What is claimed is:

1. An adaptive feedback method for a cellular communication system having a plurality of Mobile Stations (MSs) feeding back channel information to a Base Station (BS), comprising:
   selecting one of an opportunistic mode and a polling mode as a feedback mode between the BS and the plurality of MSs on the basis of system and traffic parameters;
   setting the BS and the plurality of MSs for the selected feedback mode; and
   feeding back the channel information from the plurality of MSs to the BS in the selected feedback mode,
   wherein the traffic parameters include a number 'N' of active MSs from among the plurality of MSs and the system parameters include a number of mini-slots 'K' carrying the channel information, and
   wherein the step of selecting the feedback mode includes:
   collecting the system and traffic parameters;
   computing a mode selection parameter from the system and traffic parameters;
   comparing the mode selection parameter with a predetermined threshold; and
   selecting the opportunistic mode if the mode selection parameter is greater than or equal to the threshold; and
   selecting the polling mode, if the mode selection parameter is less than the threshold.

2. The method of claim 1, wherein the mode selecting parameter is obtained by Q=N−αK, where α is a tradeoff parameter for determining a switching point between the feedback modes.

3. The method of claim 2, wherein the threshold is '0.'

4. The method of claim 1, wherein the step of setting the BS and the plurality of MSs includes:
   optimizing control parameters associated with the selected feedback mode.

5. The method of claim 4, wherein the control parameters includes a channel power threshold η and a random feedback probability p.

6. The method of claim 5, wherein the step of optimizing the control parameters for the opportunistic mode includes:
   calculating a mean sum rate of all the plurality of MSs; and
   determining the channel power threshold η and the random feedback probability p to maximize the mean sum rate.

7. The method of claim 6, wherein the mean sum rate is calculated according to:

$$C(p,\eta) = \sum_{j=1}^{N} E_{(\chi_j, S_j, T)}[\log_2(1 + \rho\chi_j)I\{S_j = 1\}]$$

where $\chi_j$ is the channel power of a $j^{th}$ MS, denoted by $\chi_j = |h_j|^2$ $S_j$ is an event that the $j^{th}$ MS is selected at the BS, T is the number of the plurality of MSs whose channel powers are above the channel power threshold η, ρ is the average signal-to-noise ratio (SNR), and I{•} is an indicator function.

8. The method of claim 7, wherein the channel power threshold η and the feedback probability p are determined according to:

$\max_{p,\eta} C(p,\eta)$ s.t. $0 \leq p \leq 1, \eta \geq 0$.

9. The method of claim 5, wherein the step of feeding back the channel information includes:
   determining, at each of the plurality of MSs, whether a channel gain of the each of the plurality of MSs is greater than the channel power threshold η; and
   feeding back the channel information with the feedback probability p when the channel gain of the each of the plurality of MSs is greater than the channel power threshold η.

10. A Base Station (BS) of a cellular communication system including a plurality of BSs, comprising:
    a scheduler which schedules services for a plurality of Mobile Stations (MSs) and decides a service rate on the basis of channel information and traffic information with the respect to the services; and
    a central feedback controller which generates feedback control signals for controlling a selected feedback mode,
    wherein the BS operates in one of at least two feedback modes selected on the basis of a mode selection parameter and the plurality of MSs feed back channel information according to the selected feedback mode,
    wherein the mode selection parameter is selected on the basis of a number 'N' of active MSs from among the plurality of MSs and a number of mini-slots 'K' carrying the channel information, and
    wherein the central feedback controller includes:
    a mode selector which selects the feedback mode by comparing the mode selection parameter with a threshold; and
    an optimizer for optimizing the feedback mode selected by the mode selector and control parameters.

11. The BS of claim 10, wherein the mode selection parameter is calculated according to Q=N−αK, where Q is the selection parameter, N is the number of the plurality of the MSs, K is the number of minislots, and α is a tradeoff parameter for deciding a mode switching point.

12. The BS of claim 11, wherein the control parameters includes a channel power threshold η and a random feedback probability p.

13. The BS of claim 12, wherein the optimizer optimizes the selected feedback mode for maximizing system throughput.

14. The BS of claim 13, wherein the system throughput is a mean sum rate of the plurality of MSs.

15. The BS of claim 14, wherein the optimizer selects the channel power threshold and the random feedback probability maximizing the mean sum rate as optimal control parameters.

16. The BS of claim 15, wherein the mean sum rate is calculated according to:

$$C(p, \eta) = \sum_{j=1}^{N} E_{(\chi_j, S_j, T)}[\log_2(1 + \rho\chi_j)I\{S_j = 1\}]$$

where $\chi_j$ is the channel power of a $j^{th}$ MS, denoted by $\chi_j=|h_j|^2$, $S_j$ is an event that the $j^{th}$ MS is selected at the BS, T is the number of the plurality of MSs whose channel powers are above the channel power threshold $\eta$, $\rho$ is the average signal-to-noise ratio (SNR), and $I\{\bullet\}$ is an indicator function.

17. The BS of claim 16, wherein the channel power threshold $\eta$ and the feedback probability p are determined according to:

$$\max_{p,\eta} C(p,\eta)$$

s.t. $0 \leq p \leq 1, \eta \geq 0$.

* * * * *